United States Patent Office 2,917,434
Patented Dec. 15, 1959

2,917,434

CO-ENZYME A AND METHOD OF CONSERVING THE SAME

Michel Robilliart, Paris, France

No Drawing. Application September 5, 1956
Serial No. 607,991

7 Claims. (Cl. 167—65)

This invention relates to co-enzyme A and to a method of conserving the said co-enzyme A as to its enzymatic properties.

Co-enzyme A, the composition of which will be set forth hereinafter, is affected by humidity and becomes unstable upon absorption of excess humidity and/or at temperatures in excess of 4° C. Heretofore it has been possible to prevent the absorption of excess humidity by co-enzyme A by lyophilization but it has always been necessary heretofore to store the product at temperatures below 4° C. to prevent it from becoming unstable and decomposing, and this has prevented it from being used in any possible practical application.

Co-enzyme A is considered to be an atypical dinucleotide in which one of the mononucleoxides may be replaced by phosphopantotheine in which the pantothenic acid is combined with a molecule of ethane-thiolamine by a peptide linkage. This peptide has been identified by Brown and Snell (J. Amer. Chem. Soc., 1950, 72, 5349) and is known as pantotheine. In the co-enzyme A molecule this peptide is bound to a molecule of adenylic acid by a pyrophosphate linkage and the adenylic acid is joined by the pyrophosphate linkage at position 3 in the ribose component of the co-enzyme A molecule.

The structural formula of co-enzyme A is shown at page 748 of the text "The Carbohydrates (Chemistry. Biochemistry. Physiology)" Academic Press Inc., New York, 1957. The structural formula also is deemed to be as follows (Govier and Gibbons, Arch. Biochem. 1951, 32, 347, King and Strong, J. Biol. Chem. 1951, 189, 325):

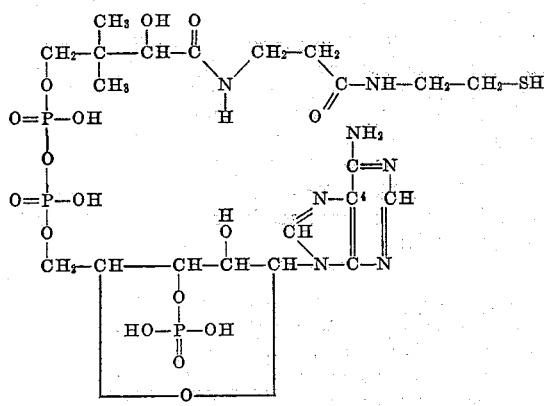

The qualitative analysis of co-enzyme A establishes that it has the following composition:

| | Percent by weight |
|---|---|
| Carbon | 32.8 |
| Hydrogen | 4.7 |
| Oxygen | 33.3 |
| Nitrogen | 12.7 |
| Phosphorus | 12.12 |
| Sulphur | 4.18 |

Other analyses of co-enzyme A establish that it has the following composition:

| | Percent by weight |
|---|---|
| Pantothenic acid | 26.6 |
| Adenylic acid | 17.6 |
| Ribose | 19.5 |

It has likewise been established that co-enzyme A has a molecular weight of 767.

It has been known heretofore that co-enzyme A is chemically unstable and tends to decompose into its various components, and that the instability of co-enzyme A upon loss of moisture, and at temperatures below 4° C., has been due to the activity of the highly reactive SH group in the molecule. However, in the present invention I have found that if the reactivity of this SH group in the co-enzyme A molecule is blocked or counteracted, in a manner which will be described presently, the resulting co-enzyme A complex is stable at normal atmospheric temperatures, after lyophilization and in a moisture-free environment. Hence the resulting co-enzyme A complex may be preserved in stable form for relatively long periods of time, and rendered capable of use for the therapeutic purposes hereinafter set forth, and perhaps also for other purposes.

Thus, in the practice of the present invention I have found that by reacting co-enzyme A with a water-soluble metal sale, including the metal salts of certain organic and inorganic acids hereinafter named, the reactivity of the SH group in the co-enzyme A is blocked off and a product is obtained which is stable as to its enzymatic properties, and has the desirable advantages, characteristics and uses hereinafter set forth. While I have found that, in general, all water-soluble non-deliquescent metal salts may be employed for the purpose of stabilizing co-enzyme A and for forming the new stabilized co-enzyme A water-soluble metal salt reaction product, certain non-deliquescent water-soluble non-toxic, bivalent metal salts of organic acids are preferable.

Thus, in the practice of the present invention I may form the new stable reaction product of co-enzyme A and a water-soluble metal by admixing the same with non-toxic, water-soluble bivalent metal salts of certain organic acids, as shown in the following examples, in which all parts indicated are by weight:

*Example No. 1*

| | Grams |
|---|---|
| Co-enzyme A | 1534 |
| Calcium gluconate | 448.3 |

*Example No. 2*

| | Grams |
|---|---|
| Co-enzyme A | 1534 |
| Calcium benzoate | 336.3 |

*Example No. 3*

| | Grams |
|---|---|
| Co-enzyme A | 1534 |
| Calcium citrate | 570.5 |

In the examples set forth above the non-toxic water-soluble bivalent metal salt, such as the calcium gluconate of Example No. 1, reacts with the co-enzyme A by replacing the hydrogen in the SH group of the co-enzyme A molecule, in accordance with the following general reaction, in which the expression CoA—SH represents the co-enzyme A molecule:

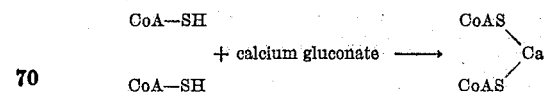

The resulting stabilized metallic salt reaction product of co-enzyme A is enzymatically stable after lyophilization but when again put into aqueous solution it is decomposed, by hydrolysis, to yield co-enzyme A.

Thus the reaction between the co-enzyme A and the water-soluble non-toxic salt, such as calcium gluconate, is in stoichiometric proportions, and if a water-soluble, non-toxic salt of a monovalent metal is employed only one gram molecule of co-enzyme A will react therewith, rather than two gram molecules, as in the foregoing Examples Nos. 1, 2 and 3.

However, in the practice of the present invention, and in the preparation of the new stabilized co-enzyme A metallic salt reaction product for medical or therapeutic use, I use an excess of the non-toxic water-soluble salt with the co-enzyme A for the reason that the excess of the salt does not affect the stability of the resulting reaction product and the excess of the salt produces, after lyophilization, a reaction product which is in the form of a visible solid cake rather than a reaction product which is too thin to be usable.

Thus, in the practice of the present invention, I may prepare the new stabilized co-enzyme A non-toxic water-soluble bivalent metal salt reaction product for medical or therapeutic use in accordance with the formulae illustrated in the following examples, in which the components are mixed with stirring at atmospheric temperatures:

*Example No. 4*

| | Parts by weight |
|---|---|
| Co-enzyme A | $\mu$g. (micrograms)__ 300 |
| Calcium gluconate | mg. (milligrams)__ 5 |

*Example No. 5*

| | Parts by weight |
|---|---|
| Co-enzyme A | $\mu$g. (micrograms)__ 300 |
| Calcium benzoate | mg. (milligrams)__ 5 |

*Example No. 6*

| | Parts by weight |
|---|---|
| Co-enzyme A | $\mu$g. (micrograms)__ 300 |
| Calcium citrate | mg. (milligrams)__ 5 |

I have found in connection with the present invention that in the case of Example No. 4, above, for illustration, the medical dosage of co-enzyme A is about 300 $\mu$g., for which the stoichiometric reactive quantity of calcium gluconate would be about 80 $\mu$g. However, if used in such stoichiometric proportions the resulting reaction product is too thin to be practically usable whereas when a substantial excess of the non-toxic, non-deliquescent water-soluble, salt is employed the resulting reaction product is a solid cake which is readily usable. However, a larger quantity of the non-toxic water-soluble metal salt may be employed, such as from 10 to 15 mg., and the only limitation on the excess quantity of the water-soluble non-toxic salt which may be employed is that of toxicity which in the case of calcium gluconate, for example, is from 2 to 3 grams for intravenous injection.

The reaction product of co-enzyme A and a non-toxic, non-deliquescent water-soluble salt, as prepared in accordance with any of the foregoing Examples Nos. 4, 5 and 6, is unstable in the aqueous physiological salt solution solvent and regenerates pure co-enzyme A by hydrolysis. Hence it is lyophilized in a 3 to 4 ml. vial and used immediately, that is, as soon as the reaction product is made.

This is accomplished by pulverizing a quantity of the new stabilized co-enzyme A metallic salt reaction product of any of the foregoing Examples Nos. 4, 5 and 6, and sterilizing the same and putting up the resulting pulverized and lyophilized product in a suitable container, such as a small vial of 3 or 4 ml. capacity, which has been filled in an inert atmosphere such as in an atmosphere of nitrogen.

Thus, the new stabilized co-enzyme A metallic salt reaction product may be prepared for intravenous or intramuscular injection by dissolving the same in a sterile physiological salt solution, in accordance with the following example:

*Example No. 7*

A—co-enzyme A-metallic salt reaction product of any of Examples Nos. 4, 5 and 6 in the quantities there indicated (lyophilized in a 3 or 4 ml. vial)

B—(solvent) sterile physiological salt solution (0.9 percent)-2 ml.

In addition to the non-toxic, non-deliquescent, water-soluble salts referred to in the foregoing Examples Nos. 1 to 6, inclusive, I may employ any non-toxic, non-deliquescent, water-soluble metallic salts of the same and other organic acids, and of certain inorganic acids, such as hydrochloric acid, for stabilizing co-enzyme A, in equivalent amounts, and typical examples of these are the non-toxic, non-deliquescent, water-soluble salts of bivalent metals such as those of magnesium, cadmium, nickel, cobalt, iron and manganese, although the water-soluble calcium salts of organic acids are preferred for the reason that they are readily water-soluble, are non-toxic and non-deliquescent.

In addition to the salts of the acids referred to above the corresponding water-soluble metallic salts of acetic, formic, lactic, succinic, tartaric acid, and other organic and inorganic acids, including the non-toxic, non-deliquescent, water-soluble salts of hydrochloric acid, sulphuric acid, and nitric acid, may be employed in equivalent amounts.

In the practice of the present invention I have further found that the stabilized co-enzyme A product prepared in accordance with the foregoing examples, may be utilized in the form of a medicament for hypodermic, that is, intravenous or intromuscular injection into the human body to induce the known therapeutic values of Co–A. The medicament referred to above may be prepared by employing the stabilized co-enzyme A-metallic salt reaction product of any of the foregoing Examples Nos. 4, 5 and 6, as a lyophilized preparation.

The resulting medicament of Example No. 7 may then be administered by intravenous or intramuscular injection in a dosage of 300 $\mu$g. per injection, then the number of injections being left to the prescription of the doctor.

The new medicament or therapeutic preparation may also be administered orally and for this purpose I may mix the stabilized co-enzyme A-metallic salt reaction product of any one of the foregoing Examples Nos. 4, 5 and 6 with a neutral filler such, for example, as talcum powder.

The new stabilized co-enzyme A-metallic salt reaction product may be used conjointly with certain other materials to orientate, favor or intensify the therapeutic action or character of the resulting product, and among these are mixtures of the new stabilized co-enzyme A-metallic salt reaction product with heparine, trypsine, ribonuclease, and the like. Thus, such a typical therapeutic composition may be prepared in accordance with the following example:

*Example No. 8*

A—co-enzyme A-metallic salt reaction product of any of Examples Nos. 4, 5 and 6 in the quantities there indicated (lyophilized in a 3 or 4 ml. vial)

B—(solvent) sterile physiological salt solution (0.9 percent) containing 25 mg. of heparine—2 ml.

The stability of the new co-enzyme A-metallic salt reaction product prepared as in the foregoing examples, has been tested and may be tested by measuring the quantity of pyruvic acid in the blood of rabbits, which have received an overdose of glucose solution, as a control. In making the desired test, the stabilized co-enzyme A metallic salt reaction product, prepared as in the foregoing examples, is injected at the rate of 12.5 $\mu$g. (micrograms) per kilogram of animal weight in to an ear vein of the rabbit. Thus, an average rabbit weighing two kilograms should receive approximately 25 μg. (micrograms) of the new stabilized co-enzyme A-metallic salt reaction product. This test may be made as follows:

Group 1 (control).—One group of rabbits is injected with a glucose solution only, as a control;

Group 2.—A second group of rabbits is injected with standard pure unstabilized co-enzyme A (Pabst) preserved in a vial, lyophilized and refrigerated below 4° C.; and with glucose—

Group 3.—A third group of rabbits is injected with standard pure co-enzyme A (Pabst) preserved in a vial and lyophilized but which has been allowed to stand for at least a week at room temperature (20° C.); and with glucose—

Group 4.—A fourth group of rabbits is injected with the stabilized co-enzyme A-metallic salt reaction product of the present invention which has been lyophilized and preserved in a vial, and which has been allowed to stand for at least a week at room temperature (20° C.), that is, for the same time and at the same temperature as the pure standard co-enzyme A of No. 3, as above and with glucose.

The quantity of pyruvic acid in the blood of the rabbits is computed by the well known method of Lu, (Bull. Soc. Chim. Biol.) as modified by Vinet and Raoul (Bull. Soc. Chim. Biol.), forty-five minutes after the injection of the pure co-enzyme A of Nos. 2 and 3, above, and forty-five minutes after the injection of the new stabilized reaction product of the present invention, as in No. 4, above.

The drop in the pyruvic acid content in the blood of the rabbits which have been injected with the new stabilized reaction product of co-enzyme A and the metallic salt of the present invention (as in Group No. 2 above) should be from 40 to 50 percent of the drop in the pyruvic acid content of the blood of the rabbits which have been injected with an overdose of glucose solution, as in control Group 1 above, whereas the blood of the rabbits which have been injected with the unstabilized co-enzyme A of Group No. 3 will show little or no drop in pyruvic acid content after the lapse of the same time, that is, forty-five minutes.

That the new stabilized reaction product of co-enzyme A and a metallic salt of the present invention preserves the properties of the pure standard stable refrigerated co-enzyme A is further shown by the fact that it maintains the same spectrophotometric and chromatographic characteristics as the pure, standard and stabilized refrigerated product.

Moreover, the new stabilized co-enzyme A-metallic salt reaction product remains physically unchanged when stored in a vial over long periods of time under normal atmospheric conditions whereas, under the same conditions the pure standard co-enzyme A, which is extremely deliquescent, tends to volatilize and disappear from such a vial.

It will thus be seen from the foregoing description that the present invention provides a new stabilized co-enzyme A-metallic salt reaction product, and a novel method of making the same, and that the invention thus has the desirable advantages and characteristics, and accomplishes its intended objects, including those hereinbefore pointed out and others which are inherent in the invention.

I claim:
1. As a new composition of matter, the reaction product of co-enzyme A and a water-soluble, non-toxic and non-deliquescent calcium salt of an acid selected from the group consisting of gluconic, benzoic, citric, acetic, formic, lactic, succinic, hydrochloric, sulphuric and nitric acids.

2. As a new composition of matter, the stabilized reaction product of co-enzyme A and one or more salts selected from the group consisting of the water-soluble, non-toxic and non-deliquescent salts of calcium, copper, magnesium, cadmium, nickel, cobalt, iron, and manganese salts of gluconic, benzoic, citric, acetic, formic, lactic, succinic, tartaric, hydrochloric, sulphuric and nitric acids.

3. As a new composition of matter, the reaction product of co-enzyme A and calcium gluconate.

4. A method of forming a stabilized reaction product of co-enzyme A which consists in reacting co-enzyme A with calcium gluconate.

5. A method of forming a stabilized reaction product of co-enzyme A which consists in reacting co-enzyme A with the calcium salt of an acid selected from the group consisting of gluconic, benzoic, citric, acetic, formic, lactic, succinic, tartaric, hydrochloric, nitric and sulphuric acids.

6. A method of forming a stabilized reaction product of co-enzyme A which consists in reacting co-enzyme A with one or more water-soluble, non-toxic and non-deliquescent salts selected from the group consisting of the calcium, copper, magnesium, cadmium, nickel, cobalt, iron, and manganese salts of gluconic, benzoic, citric, acetic, formic, lactic, succinic, tartaric, hydrochloric, sulphuric and nitric acids.

7. A method of forming a stabilized reaction product of co-enzyme A which consists in reacting co-enzyme A with one or more water-soluble, non-toxic and non-deliquescent salts selected from the group consisting of the calcium, copper, magnesium, cadmium, nickel, cobalt, iron, and manganese salts of gluconic, benzoic, citric, acetic, formic, lactic, succinic, tartaric, hydrochloric, sulphuric and nitric acids, and dissolving the said reaction product in a sterile physiological salt solution.

References Cited in the file of this patent

Lipmann et al.: "Journal Biological Chemistry," vol. 186 (1950), pp. 235–236 relied on.